Nov. 11, 1941.　　　　　P. EISLER　　　　　2,262,136
APPARATUS FOR CYCLIC DEFLECTION OF LIGHT
Filed May 8, 1941
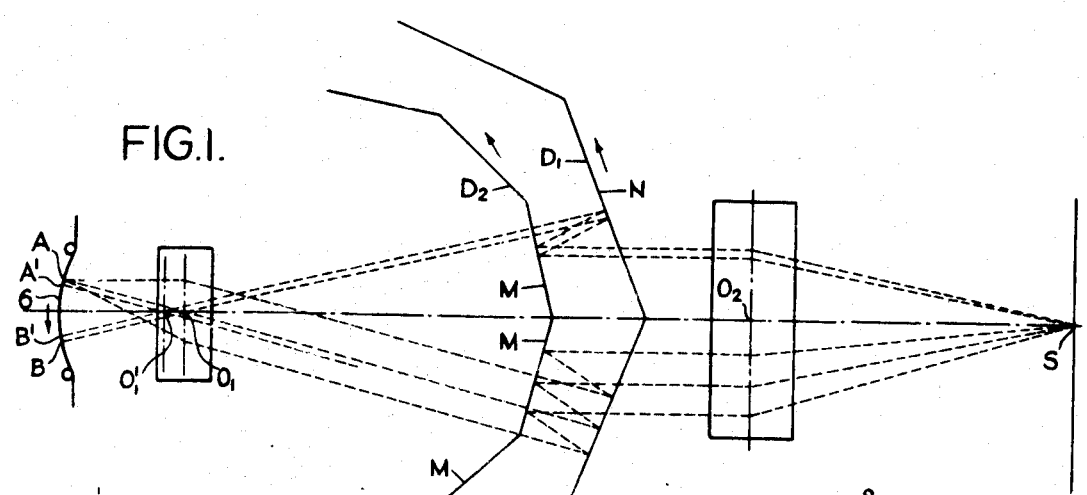
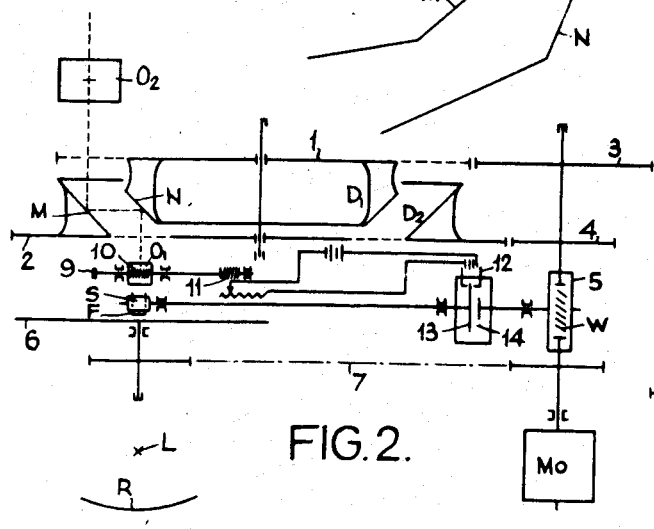
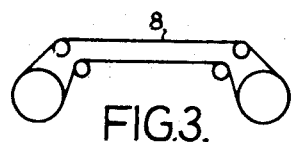
FIG.3.
FIG.4.
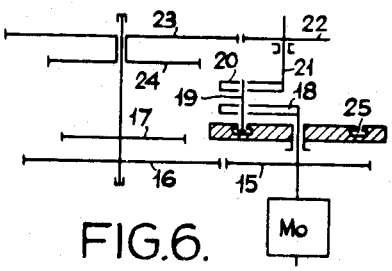
FIG.6.
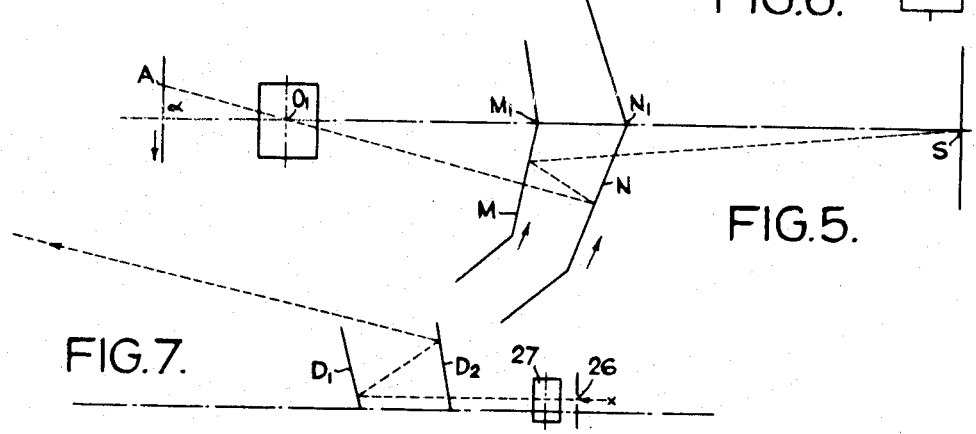
INVENTOR,
Paul Eisler
BY Simon H. Broder
his ATTORNEY.

Patented Nov. 11, 1941

2,262,136

UNITED STATES PATENT OFFICE 2,262,136

APPARATUS FOR CYCLIC DEFLECTION OF LIGHT

Paul Eisler, St. John's Wood, London, England, assignor to Cinema Electric Commodities Limited, London, England, a corporation of Great Britain Application May 8, 1941, Serial No. 392,535
In Great Britain August 2, 1939

8 Claims. (Cl. 88—16.8)

The present invention relates to optical apparatus for the cyclic deflection of a light beam through a small angle for instance in kinematograph and television apparatus. Where the required angular deflection is directly proportional to time, such deflection can be obtained by a uniformly rotating drum carrying plane reflectors in polygonal formation, each reflector coming into action in turn. Each successive deflection will be twice the angle subtended at the axis of the drum by the reflector in action so that if only a small deflection is necessary a large number of reflectors must be used with consequent large bulk of drum in relation to the size of one reflector.

This difficulty can be avoided by the use of two drums having different numbers of reflectors arranged and rotated so that the beam is deflected by a reflector on each drum in succession and so that the two deflections are opposed, the total cyclic deflection thus being the difference of that due to each. Such a combination of reflector drums gives the equivalent of a single drum carrying a number of reflectors equal to the product of the numbers on the two drums divided by their difference. The speeds of rotation of the drums must clearly be inversely proportional to the respective numbers of reflectors.

As above mentioned the angular deflection obtained with such apparatus is directly proportional to time and the apparatus is therefore not adapted to compensate directly the movement of the film in kinematograph apparatus of the continuously moving film kind wherein the film moves in a straight line through the conjugate focal plane of the objective. In such apparatus it is the tangent of the angle subtended at the objective which is proportional to time; a similar relation holds in the case of television scanning on to a flat screen.

In the case of kinematograph apparatus of the continuously moving film kind the present invention provides two methods of making the necessary connection. According to the first method, which is on the lines of a method known in connection with a compensator using a cam actuated reflector, the film is run through a gate curved substantially concentrically about an axis through the optical centre of an objective set at or approximately at its focal length from the gate so that the emergent beam is substantially parallel and is rotating about the said axis at a uniform angular speed; accordingly the reflector drums can exactly compensate this angular movement if the focal length of the objective bears the correct relationship to the picture height on the film, and the beam after compensation is merely moving parallel with itself and can accordingly be brought to a focus on the screen by a teleobjective. Accordingly to the second method the necessary correction is provided by introducing a corresponding cyclic variation into the rotation of the drums in relation to each other and to the beam; preferably the variation is made wholly in the rotation of one of them while the other rotates steadily. Such a scheme can be used with a normal projection system, but has the disadvantage that the projector can only be designed to deal with a particular focal length of objective and screen distance, but it can be used with a stationary light source as may be necessary for certain types of television scanner.

The drums need not be coaxial though that is usually simplest. Since only one reflector on each drum can be in action at a time, the outer drum can be supported from a hub by arms placed between the reflectors upon it without interfering with the beam. Apart from the cyclic deflection there will in general be a constant deflection, i. e., a change of direction due to the use of reflectors independently of their rotation but this is incidental and will only be mentioned hereinafter where its effect needs to be taken into consideration.

The reflectors must be placed so that they do not interfere with one another. This can be done with coaxial drums by setting them so that their planes are inclined to the axis of rotation. For example one set may be set pyramidally on the outside of an inner drum and the other set pyramidally on the inside of an outer drum. Then the beam enters and leaves generally parallel with the axis of rotation but is displaced laterally, while the deflection takes place in a direction perpendicular to the plane of lateral displacement. Which drum carries the larger number and which the smaller will be a matter of convenience in any particular case.

The invention will be further described with reference to the accompanying drawing which diagrammatically illustrates the application of the invention to two forms of cinematograph projector and a form of scanner for television apparatus.

Figure 1 is an elevation illustrating in principle one application of the invention to a cinematograph projector, Figure 2 is a schematic plan view showing the construction of a projector based upon Figure 1, Figures 3 and 4 are views of a detail modification, Figure 5 is an elevation illustrating in principle the application of the invention to another form of cinematograph projector.

Figure 6 schematically illustrates certain mechanical features of a projector based on Figure 5 and Figure 7 illustrates the application of the invention to a mechanical television scanner.

The scheme shown in Figure 1 comprises an optical system which apart from the two reflector drums is on known principles but hitherto has only been practically constructed with a series of detached reflectors which come into action in turn, each while in action being oscillated by a spiral cam. The substitution of the two reflector drums has the great advantage that only simple steadily rotating parts are necessary.

In Figure 1, A is a point on a film moving steadily in the direction of the arrow, $O_1$ is the optical centre of an objective, $D_1$ and $D_2$ are drums carrying reflectors, and S is a point on a screen at which the image is focused by the aid of a tele-objective having its optical centre at $O_2$. The principal rays from A to S are indicated by dotted lines and the displacements of the rays in directions perpendicular to the plane of the drawing are ignored; such displacements are in fact necessary to enable the rays to be incident first on one of the reflectors N and also to pass from the corresponding reflector M to the tele-objective.

During its projection the film passes through a gate 6 curved substantially concentrically about an axis through the point $O_1$, and the objective which is suitably corrected is set so that the film in the gate is at or approximately at its focus. Consequently the beam emerging from the objective is substantially parallel and is rotating about the axis through the point $O_1$ at a steady angular speed. The reflectors M and N are arranged on their reflector drums in regular distribution, but their numbers ($m$ and $n$ respectively) differ by a small number, say 1. The drums are rotated steadily in counter-clockwise direction and their speeds of rotation and the focal length of the objective are chosen as explained below, so that during each picture cycle the rays from any point such as A do not diverge between drum $D_2$ and the tele-objective but remain parallel and the image of A is merely translated laterally so that the point S remains stationary. It will be apparent that there is a stationary point in the screen corresponding to every point on the film so that the complete image on the screen is stationary during each cycle.

The drums are rotated at such uniform speeds that one reflector on each comes into action per picture cycle. Accordingly the angle through which each drum rotates per picture cycle is $$\frac{360°}{n}$$

and $$\frac{360°}{m}$$

respectively. The effect of $D_1$ is to rotate the beam steadily through an angle of $$\frac{720°}{n}$$

counter-clockwise, and the effect of $D_2$ is to reverse this, i. e., convert it into a clockwise rotation by mere reflection and to add to it a steady rotation of $$\frac{720°}{m}$$

in a counter-clockwise direction due to rotation of the drum $D_2$. The total deflection is thus $$\frac{720°}{n} - \frac{720°}{m}$$

clockwise. Since the beam incident upon drum $D_1$ is rotating steadily counter-clockwise the net rotation of the beam leaving drum $D_2$ will be zero, if the angle of rotation per cycle of the beam incident upon drum $D_1$ is equal to the above stated clockwise rotation due to the drums. Moreover since all the rotations are steady the beam leaving drum $D_2$ will remain parallel with itself during the whole picture cycle and will be merely translated laterally, a displacement which is dealt with by the tele-objective.

The angle of rotation per cycle of the beam through the objective is determined by the picture pitch P and the distance from the film to the centre of the gate curvature which is equal to or approximately equal to the focal length ($f$) of the objective, and it amounts to $$P\frac{180°}{f\pi}$$

Accordingly $$f = \frac{P.(m-n)}{4\pi(m-n)}$$

Since P is at least nominally fixed and also $m$ and $n$ must be whole numbers, $f$ can only have one of a series of definite values in practice, but for the standard film pitch of ¾ inch, with reasonably small numbers for $m$ and $n$, say 9 and 8 (equivalent to a single drum carrying 72 reflectors which would need to be about three inches in length involving a drum diameter of almost six feet), a convenient practical value for $f$ of just under 4½ inches is obtained. Moreover the drum speeds are but 180 and 160 R. P. M. for 24 frames per second. It should be noted that with the arrangement shown in Figure 1 $m$ must be larger than $n$.

It will be observed that the reflectors must be large enough to follow the full swing of the beam per cycle but the necessary size can be easily determined and provided in practice. The nearer the drums are to the objective the smaller are the reflectors and the smaller the lateral displacements of the beam.

As above mentioned P is nominally fixed but in practice shrinkage of film is met with, and to obtain proper stabilization of the picture on the screen, the film speed should be reduced proportionately and at the same time provision made for correction in the optical system. For instance the reflectors might be made adjustable radially on the drum, but it is far preferable to make the drums as rigid as possible and to provide the adjustment at the objective. This can be done by using an objective comprising elements separately adjustable, for example by cam slots in the mount enabling its optical centre to be shifted towards the film. In Figure 1 AB indicates the normal pitch and $A^1B^1$ the reduced pitch due to shrinkage, and $$O_1^1$$

indicates the corresponding position of the optical centre of the objective. The gate is of course not concentric with $$O_1^1$$

but the departure is negligible in practice, though an adjustable gate might be used. The adjustment of the optical centre is preferably coupled with the film speed adjustment, and one suitable arrangement is described below.

Figure 2 illustrates diagrammatically the lines of construction of an example of cinematograph projector working on the principles of Figure 1 and as far as applicable the same references have been used. The first difference which will be noted is that the drum axis is parallel to the axis of projection and the reflectors are set in pyramidal formation (in the example illustrated so as to lie tangentially to a cone having a vertex angle of 90°) in order to provide an uninterrupted path for the rays. The reflectors are carried upon respective toothed wheels 1, 2, at least part of the wheels being spoked with the spokes at suitable positions to cause minimum interference, i. e., at the junction of the reflectors.

The projector is driven by a motor Mo which directly drives two toothed wheels 3, 4 meshing with wheels 1, 2 respectively. The motor shaft also carries a worm W meshing with a work wheel 5 which drives a sprocket S for the film F. Correct framing may be provided for by any suitable means, for instance by making worm W adjustable axially. The film is illuminated by any conventional system comprising for example a light source L, a reflector R, and if desired a condenser (not shown). During projection the film in the gate is moving, and means may be provided for causing a patch of illumination to follow the film. But the conventional illuminating system can easily provide an area of illumination of twice the height of one film picture and it is therefore sufficient and in practice much simpler to provide means for masking the moving film picture. In Figure 2 such means comprises a disc 6 in which a spiral slot is cut, the disc being rotated at proper speed by a chain drive 7 from a sprocket on the motor shaft. Instead of this slotted disc, a slotted endless band 8 illustrated in Figures 3 and 4 may be used. In this case it will be observed that two portions of the band are in the beam simultaneously, and this must be taken into account in determining the length of the band and the shape of the slot; it would suffice for instance to make the band of such length that one complete traverse covers two picture cycles, and to set it symmetrically in relation to the film.

Figure 2 also illustrates one possible form of combined shrinkage adjustment. Here a rotation of a control member 9 simultaneously adjusts the objective at 10 and a rheostat at 11. The rheostat is in the circuit of an electromagnet 12 which provides eddy current braking of a disc 13 on the drive side of a slip coupling 14 provided in the drive between the worm wheel 5 and the sprocket S. The coupling must be one which will slip smoothly and may be hydraulic or magnetic.

Figure 5 illustrates the principle of a somewhat different projector employing the two reflector drums. Here the film does not run through a curved gate but through a straight one, also no tele-objective is shown, and the deflection produced by the reflectors alone is employed to stablise the picture on the screen, the objective $O_1$ being used to focus the rays from A to S. It can be shown that if $\alpha$ is at any instant the angle between the beam before reflection and the axis $O_1S$, and if $\omega$ is the total deflection produced at that instant by the reflectors, then to keep the image of A at S $$\sin \frac{\omega}{2} = \frac{\tan \alpha}{1 - \frac{a}{c}\sqrt{1 + \tan 2\frac{\alpha}{2}}}$$

where $c$ is half the distance from $O_1$ to $S$ and $a$ has a value which strictly varies with $\alpha$ but which can be regarded as constant with sufficient accuracy for practical purposes. Such value is $c - O_1M_1 + N_1M_1$ where $M_1$ and $N_1$ are the intersections, of the reflectors M and N with the axis $O_1S$ at the instant $\alpha$ is at its maximum. The value of $a$ so expressed is in fact a value lying between the exact value when $3\alpha = O$ and $\alpha$ is at its maximum.

It will be apparent that for the above relationship to hold good, the angular velocity of deflection of the beam produced by the two reflector drums is not constant so that it cannot be produced by uniform rotation of the two drums. The departure from uniform rotation is not great however, and Figure 6 shows schematically a mechanism which can be used to produce the desired result. Here the motor Mo drives through gear wheels 15, 16 a further wheel 17 by which one of the reflector drums is rotated uniformly. The motor shaft also carries a crank arm 18 which has a sliding engagement with a pin 19 which also has a sliding engagement with another crank arm 20, on a shaft 21 out of alignment with the motor shaft. This shaft carries a wheel 22 which through further wheel 23, 24 drives the other reflector drum. The radial position of the pin 19 as the two cranks rotate is determined by a stationary cam groove 25; the gear values are such that the two cranks make one revolution per picture cycle and the cam is shaped so that the angular velocity of the drum varies so as to satisfy the conditions laid down above. The actual shape obtained is more or less oval.

It should here be mentioned that a projector according to Figures 5 and 6 can only deal with fixed conditions, i. e., a fixed maximum value of $\alpha$.

Figure 7 illustrates the application of the invention to one direction of scanning for example in a mechanical television projector. Here a beam coming through a stationary narrow slit 26 and objective 27 is used, the slit being transverse to the direction in which the light is to be moved on the viewing screen by the scanner. The beam is incident first on drum $D_1$ then on drum $D_2$ and finally falls on the screen. If both drums rotate uniformly the linear speed of movement of the line of light on the screen will not be uniform though the angular speed of the beam will be. To obtain a uniform linear speed a mechanism such as that shown in Figure 6 can be used in the drum drive. It will be understood that other devices controlling the light may be used in connection with the above described scanner. For instance a second scanner which controls the scanning of a light spot along the line scanning afforded by the drums may be interposed in the beam at a suitable point. The above described scanner can also be used for producing various lighting effects, such as pattern effects or for certain types of advertising sign.

In general the invention can be used in any case where cyclic angular deflection of a beam of light, or compensation of a beam suffering cyclic angular deflection, is required.

What I claim is:

1. Means for cyclically deflecting a beam of light through an angle, comprising two coaxial drums, a series of reflectors on each drum uniformly distributed around the periphery thereof, the number of reflectors on one drum differing by a small number from that on the other, and said reflectors being so placed that light incident from a determined direction on one drum will be reflected on to the reflectors on the other, and means for rotating said drums simultaneously at average speeds inversely proportional to their respective numbers of reflectors.

2. A kinematograph projector, comprising an objective; a gate set substantially at the focus of said objective and curved concentrically about the optical centre thereof; means for feeding a picture band through said gate at a uniform speed; means for deflecting the beam coming from said objective so that the beam remains parallel with itself throughout a picture cycle, said deflecting means including two drums, different numbers of reflectors on said respective drums and means for rotating said drums at uniform speeds inversely proportional to the respective numbers of reflectors, said drums being placed so that the beam is incident upon them in turn and so that the total deflection is the difference of the deflection due to each; and a teleojective placed to receive the deflected beam and bring it to a focus.

3. A kinematograph projector as set forth in claim 2, comprising means for adjusting simultaneously the speed of the picture band and the objective to allow for the shrinkage of the band and thereby keep constant the angle of rotation per picture cycle of the beam coming through the objective.

4. Means for cyclically deflecting a beam of light through an angle at a non-uniform angular speed, comprising two drums, different members of reflectors respectively carried by said drums, means for rotating said drums at average speeds inversely proportional to the respective number of reflectors, said drums being placed so that the beam is incident upon them in turn and so that the total deflection is the difference of the deflection due to each, and means for cyclically varying the speed of rotation of said drums in relation to each other and to the beam in correspondence with the desired law of reflection.

5. Means for cyclically deflecting a beam of light through an angle at a non-uniform angular speed, as set forth in claim 4, including means for rotating one drum at uniform speed and the other at non-uniform speed.

6. Means for cyclically deflecting a beam of light through an angle at a non-uniform angular speed, comprising two drums, different numbers of reflectors respectively carried by said drums, said drums being placed so that the beam is incident upon them in turn and so that the total cyclic deflection is the difference of the deflection due to each, means for rotating one of said drums at a uniform speed, and means for rotating the other of said drums at an average speed which bears a ratio to said uniform speed in inverse ratio to the respective numbers of reflectors on said drums, said second mentioned drum rotating means including a crank rotating at uniform speed once per cycle, a second crank opposite but axially out of alignment with said first crank, a pin forming a radially sliding connection between said cranks, and a closed circuit cam track controlling the radial position of said pin.

7. A kinematograph projector, including a straight film gate, means for feeding a film at a uniform speed through said gate, means for illuminating said gate, objective means for projecting an image, and beam deflecting means as set forth in claim 6 located between said gate and said objective means, the cam track of said deflecting means being shaped so that the image projected by said objective means is stationary.

8. In a kinematograph projector having a straight film gate and means for feeding a film at a uniform speed through said gate, the combination of a pair of coaxial drums, different numbers of reflectors on the peripheries of said drums respectively, said drums being positioned so that a ray from said gate will be incident upon a reflector of each drum in succession, means for rotating one of said drums at a uniform speed inversely proportional to the respective numbers of reflectors upon it, means for rotating the other of said drums at an average speed inversely proportional to the number of reflectors upon it but varying cyclically so that the resulting cyclic deflection of the second ray compensates for the cyclic difference of the ray caused by the movement of the film through said gate, and objective means for forming an image located in the path of rays coming from said second drum.

PAUL EISLER.